March 4, 1958 — J. J. McDONALD — 2,825,446
AUTOMOBILE ASH TRAYS
Filed June 8, 1956 — 2 Sheets-Sheet 1

INVENTOR.
JOHN J. McDONALD
BY J. Ledermann
ATTORNEY

March 4, 1958  J. J. McDONALD  2,825,446
AUTOMOBILE ASH TRAYS
Filed June 8, 1956  2 Sheets-Sheet 2
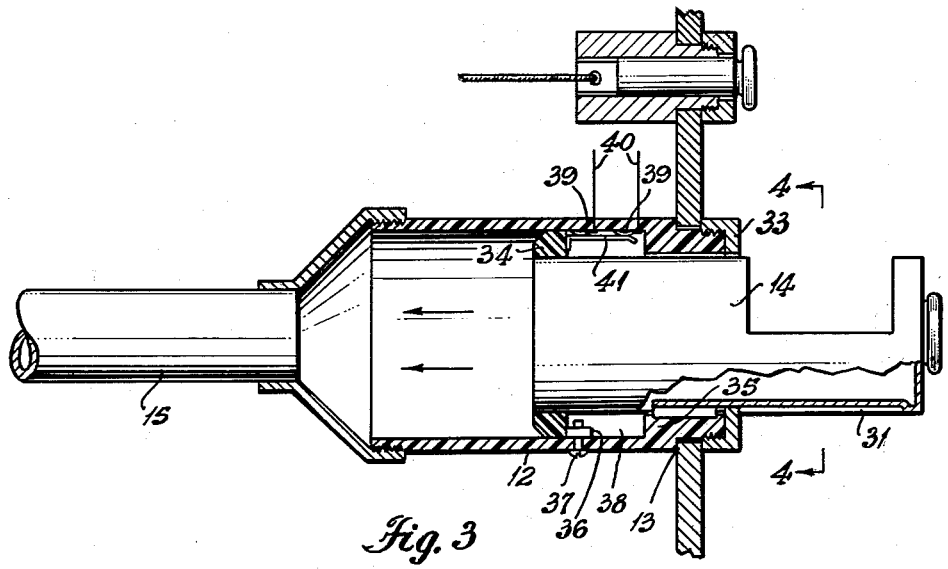
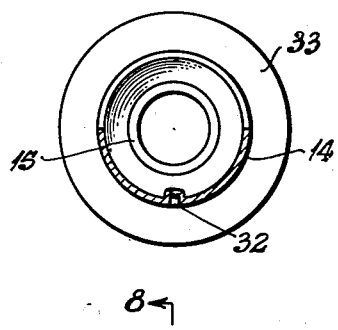
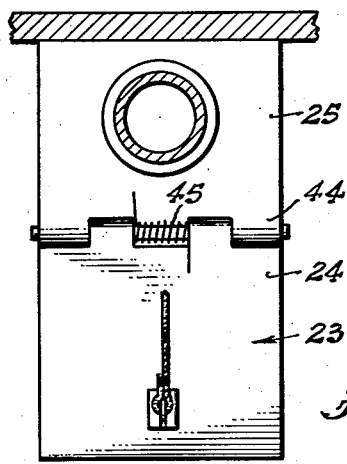
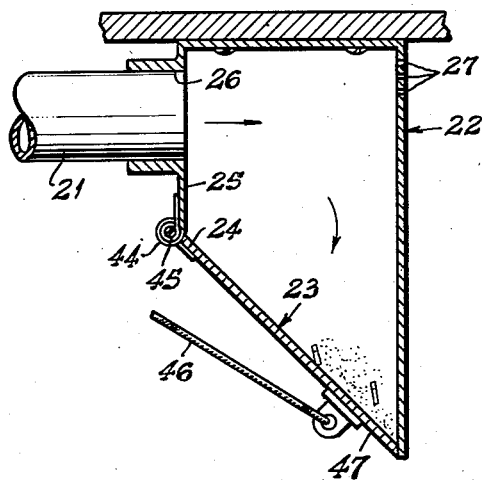
INVENTOR.
JOHN J. McDONALD
BY
ATTORNEY United States Patent Office 2,825,446
Patented Mar. 4, 1958

2,825,446

AUTOMOBILE ASH TRAYS

John Joseph McDonald, Brooklyn, N. Y.

Application June 8, 1956, Serial No. 590,266

5 Claims. (Cl. 206—19.5)

This invention relates to automobile ash trays, and an object thereof is the provision of certain new and useful improvements in means associated therewith, whereby a conduit is provided leading from the ash tray to the underside of the car into a receiver having a door for emptying the same periodically, together with a blower which blows the cigarette butts, ashes etc. down the conduit and which is automatically energized on pulling out the ash tray and is automatically cut out when the ash tray is pushed back in, with a manual control provided near the ash tray for opening the receiver door to expel the accumulated butts.

The above broad as well as additional and more specific objects will be clarified in the following description wherein reference numerals refer to like-numbered parts in the accompanying drawings. It is to be noted that the drawings are intended solely for the purpose of illustration and that it is therefore neither desired nor intended to limit the invention necessarily to any or all of the exact details of construction shown or described except insofar as they may be deemed essential to the invention.

Referring briefly to the drawing,

Fig. 3 is a sectional view taken on the line 3—3 of Fig. 2;

Fig. 4 is a sectional view taken on the line 4—4 of Fig. 3;

Fig. 7 is a sectional view taken on the line 7—7 of Fig. 1;

Fig. 8 is a sectional view taken on the line 8—8 of Fig. 7;

Figure 1:
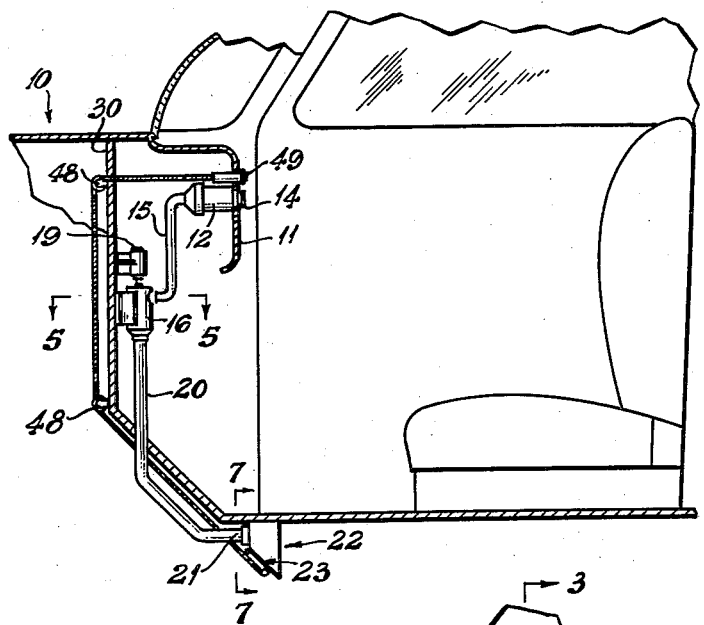
Fig. 1 is a fragmentary longitudinal sectional view through an automobile equipped with an embodiment of the present invention.
Figure 2:
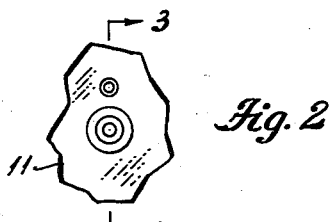
Fig. 2 is a fragmentary front view of the dash board of the automobile, showing the ash tray and the pull knob for operating the receiver door, positioned above the tray.

Referring in detail to the drawing, the numeral 10 indicates an automobile of which the dash board is shown at 11. An insulated tubular housing 12 is supported in an opening 13 through the dash board, and an ash tray 14 is slidably mounted therein and adapted to be pulled outward, to the right, Fig. 3, substantially into the position shown, for access thereto.

A conduit 15 leads from the rear end of the housing 12 into a cylinder 16 in which a fan or blower impeller 17 is mounted on a shaft 18 driven by a motor 19. A conduit 20 leads from the bottom of the cylinder 16 and is bent in a rearward direction to terminate under the floor of the vehicle in an exhaust end 21. A receiver 22 is supported under the vehicle and is provided with a door 23 hinged on a horizontal axis at its upper end 24 to the front wall 25 of the receiver. The end 21 of the conduit 20 is secured in an opening 26 in the said front wall, and a plurality of vents 27 are provided in the rear wall 22, which are preferably of very small diameter. Brackets 28 and 29 hold the cylinder 16 and the motor 19, respectively, to a rigid portion 30 of the vehicle.

The ash tray 14 may be provided with a longitudinal groove 31 in its underside, in which a lug 32 on the rim or annular cap 33 of the forward end of the housing 12 registers slidably, to prevent rotary movement of the tray in case the latter is of circular conformation as shown. At its rear end the tray 14 is provided with a flange 34, external and circumferential with respect to the tray. An internal flange 35 on and near the forward end of the housing 12, is provided substantially as shown. A limit stop to the forward movement of the tray 14 to the position thereof shown in Fig. 3 is provided, which may be in the form of a block or nut 36 secured on the floor of the housing by a screw 37 passing therethrough.

As shown in Fig. 3, in the forwardmost position of the tray 14 an annular space 38 is provided between the housing 12 and the tray. Longitudinally spaced electric contacts 39 are mounted in this space against the inside of the housing 12, from which wires 40 lead. A resilient contact finger 41 extends forward from its base which is secured against the wall of the flange 34 on the tray, and is longitudinally aligned with the contacts 39 so that, in the position shown in Fig. 3, this finger bridges the contacts and hence closes the circuit therethrough; hence the two contacts together with the spring finger comprise an electric switch 42 which is closed when the ash tray is pulled out to the position shown, and which is automatically opened when the tray is pushed back home, as is obvious.

Figure 9:
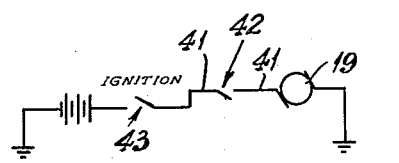
Fig. 9 is a wiring diagram.

The wiring diagram is simple and is shown in Fig. 9, with the circuit for the motor 19 preferably in series with contacts on the ignition switch 43 so that the motor cannot be energized while the vehicle is parked in case the driver should forget to shut off the engine.

Figures 5, 6:
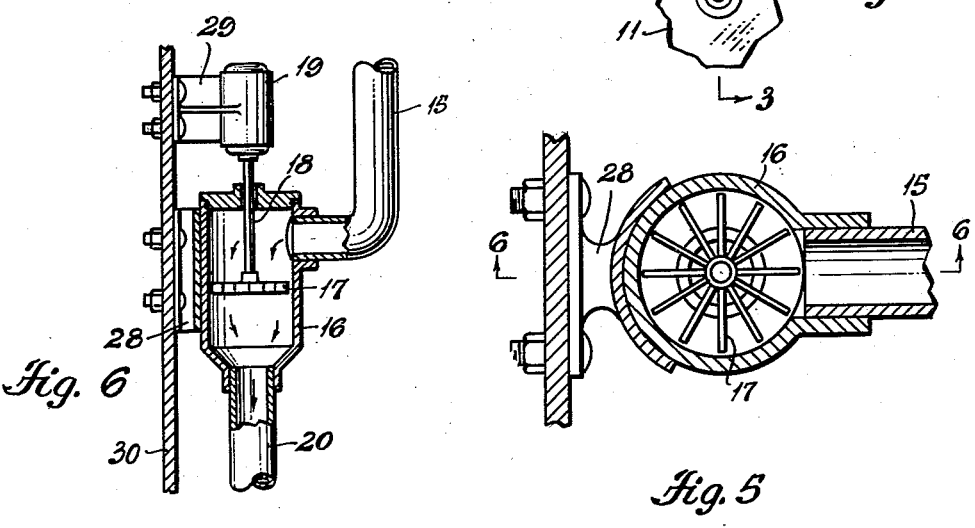
Fig. 5 is a sectional view taken on the line 5—5 of Fig. 1.
Fig. 6 is a sectional view taken on the line 6—6 of Fig. 5.

It is now apparent that, as soon as the ash tray 14 is pulled out in order to dispose of a cigarette or the like, the motor will be energized to draw the butt or ashes, etc. down the conduits 20, 15 and will deposit them in the receiver 22, and the draft will be especially strong since the motor will be running at full speed almost immediately after the switch is closed and before the butt can be deposited in the tray. The point of entry of the conduit 15 into the cylinder 16 could be positioned below the impeller 17 instead of above it as shown in Fig. 6. However, as shown, the impeller will act as a chopper or cutter to break up the butts into very small pieces in passing through the impeller.

It is of course necessary to empty the receiver 22 of its accumulated contents from time to time, and this is done preferably when the vehicle is not on a highway or street so that the contents are not scattered as litter. To enable opening of the door 23 to be effected conveniently from within the vehicle, the following means has been provided.

The hinge 44 securing the door 23 to the wall 25 of the receiver 22 is provided, in the usual manner, with a spring 45 which normally maintains the door in closed position. A cable 46 has its lower end 47 secured to the lower end 47 of the door 23 and is trained about guides 48 and brought through openings in the body portion 30 and the dash board 11 to terminate in a grip 49 positioned near or above the ash tray 14. To open the door to empty the receiver, the grip 49 is pulled out for a moment and the contents of the receiver will fall out. In order to make certain that the receiver will be emptied, the ash tray may also be pulled out at the same time, to cause the blower to operate and thus forcefully remove the receiver contents.

It is apparent from the above that a useful and practical as well as safe and clean way has been provided for disposal of cigarette butts etc. resulting from smoking in a vehicle.

I claim:

1. In an automobile having an ash tray movably mounted in a part of the body thereof and alternately movable between a position of access to the interior of the tray and a position of non-access to the same, a conduit leading downward from the interior of the tray and terminating in an exhaust at a point external to the vehicle body, a blower including an impeller interposed in said conduit to force matter from the tray through the conduit, said blower including an electric motor for actuating the impeller, and an electrical switch, said switch comprising a pair of spaced contacts secured to the body adjacent the tray and in the path of movement of the tray and means on the tray for electrically connecting said contacts when the tray is moved to said first-named position and for disconnecting the contacts when the tray is moved to said last-named position, said switch and said motor being adapted to be connected in circuit with an electric source.

2. The device set forth in claim 1, said conduit including a housing, two spaced portions and a cylinder, one of said portions having the upper end thereof connected to the rear of said housing and the lower end thereof connected to said cylinder, the other of said portions having said exhaust at the lower end thereof and the upper end thereof connected to said cylinder at a point distant from the point of connection of the lower end of said one of said portions, said impeller being positioned in said cylinder between said points of connection to the cylinder of said portions.

3. The device set forth in claim 1, a receiver mounted on the vehicle external to the vehicle having said conduit exhaust connected thereto and having a normally closed door for emptying the same, said door having a spring normally urging the door into normally closed position, a cable having its lower end attached to the door for pulling the door open, said cable extending upward and having a hand grip on the upper end thereof slidably mounted in the dashboard adjacent said opening.

4. The device set forth in claim 1, said part of the body having a tubular housing positioned substantially horizontally in an opening therethrough, said ash tray registering slidably in said housing, said conduit including two spaced portions and a cylinder, one of said portions having the upper end thereof connected to the rear of said housing and the lower end thereof connected to said cylinder, the other of said portions having said exhaust at the lower end thereof and the upper end thereof connected to said cylinder at a point distant from the point of connection of the lower end of said one of said portions, said impeller being positioned in said cylinder between said points of connection to the cylinder of said portions.

5. The device set forth in claim 1, having a receiver mounted on the vehicle external to the vehicle, said receiver having said conduit exhaust connected thereto and having a normally closed door for emptying the receiver, said door having a spring normally urging the door into closed position, a cable having its lower end attached to the door for pulling the door open, said cable extending upward and having a hand grip on the upper end thereof slidably mounted in the vehicle body adjacent said opening.

References Cited in the file of this patent

UNITED STATES PATENTS

| | | |
|---|---|---|
| 2,014,030 | Punke | Sept. 10, 1935 |
| 2,558,255 | Johnson | June 26, 1951 |
| 2,559,178 | Thompson | July 3, 1951 |
| 2,663,504 | Hooker | Dec. 22, 1953 |
| 2,716,464 | Weisbecker | Aug. 30, 1955 |